United States Patent [19]

Burney

[11] 4,352,403
[45] Oct. 5, 1982

[54] VEHICLE SPEED CONTROL SYSTEM

[75] Inventor: Charles F. Burney, Milpitas, Calif.

[73] Assignee: Travel Accessories Manufacturing Co., Inc., Orland, Calif.

[21] Appl. No.: 23,027

[22] Filed: Mar. 22, 1979

[51] Int. Cl.³ .............................................. B60K 31/00
[52] U.S. Cl. .................................... 180/176; 123/352; 361/242
[58] Field of Search ............... 180/175, 176, 177, 178, 180/179, 170; 123/349, 350, 352; 361/239, 242

[56] References Cited

U.S. PATENT DOCUMENTS

| | | | |
|---|---|---|---|
| Re. 27,324 | 3/1972 | Granger et al. | 180/176 |
| 3,062,312 | 11/1962 | Dietrich et al. | 180/176 |
| 3,109,507 | 11/1963 | McMurray et al. | 180/177 |
| 3,766,367 | 10/1973 | Sumiyoshi et al. | 180/176 X |
| 3,793,622 | 2/1974 | Hida et al. | 180/176 X |
| 3,893,537 | 7/1975 | Sakakibara | 180/176 |
| 3,899,716 | 8/1975 | Kaminski | 317/5 |
| 3,946,707 | 3/1976 | Gray | 123/350 |
| 3,952,829 | 4/1976 | Gray | 123/350 |
| 4,006,791 | 2/1977 | Feldmann et al. | 180/176 |
| 4,056,157 | 11/1977 | Kawata | 180/176 |
| 4,083,423 | 4/1978 | Williams et al. | 73/519 X |
| 4,117,903 | 10/1978 | Fleischer et al. | 123/352 X |
| 4,121,273 | 10/1978 | Jarrett et al. | 180/176 X |
| 4,133,406 | 1/1979 | Allerdist | 180/179 |
| 4,155,419 | 5/1979 | Mann | 180/176 |
| 4,157,126 | 6/1979 | Collonia | 180/179 X |
| 4,202,424 | 5/1980 | Sakakibara et al. | 180/176 |

Primary Examiner—Joseph F. Peters, Jr.
Assistant Examiner—Michael Mar
Attorney, Agent, or Firm—Flehr, Hohbach, Test, Albritton & Herbert

[57] ABSTRACT

System for controlling the speed of a vehicle such as an automobile. The operator selects the desired speed, and thereafter the system brings the vehicle to the desired speed and maintains it at that speed. The system can be calibrated for any given vehicle, and it cannot be engaged until the vehicle is moving at a predetermined percentage or fraction of the desired speed. The system can be disengaged in a number of ways to return full control of the vehicle to the operator, and redundant circuits are employed to assure disengagement upon application of the brakes. As the desired speed is approached, the amount of correction is decreased to assure a smooth, positive transition to the desired speed.

17 Claims, 7 Drawing Figures

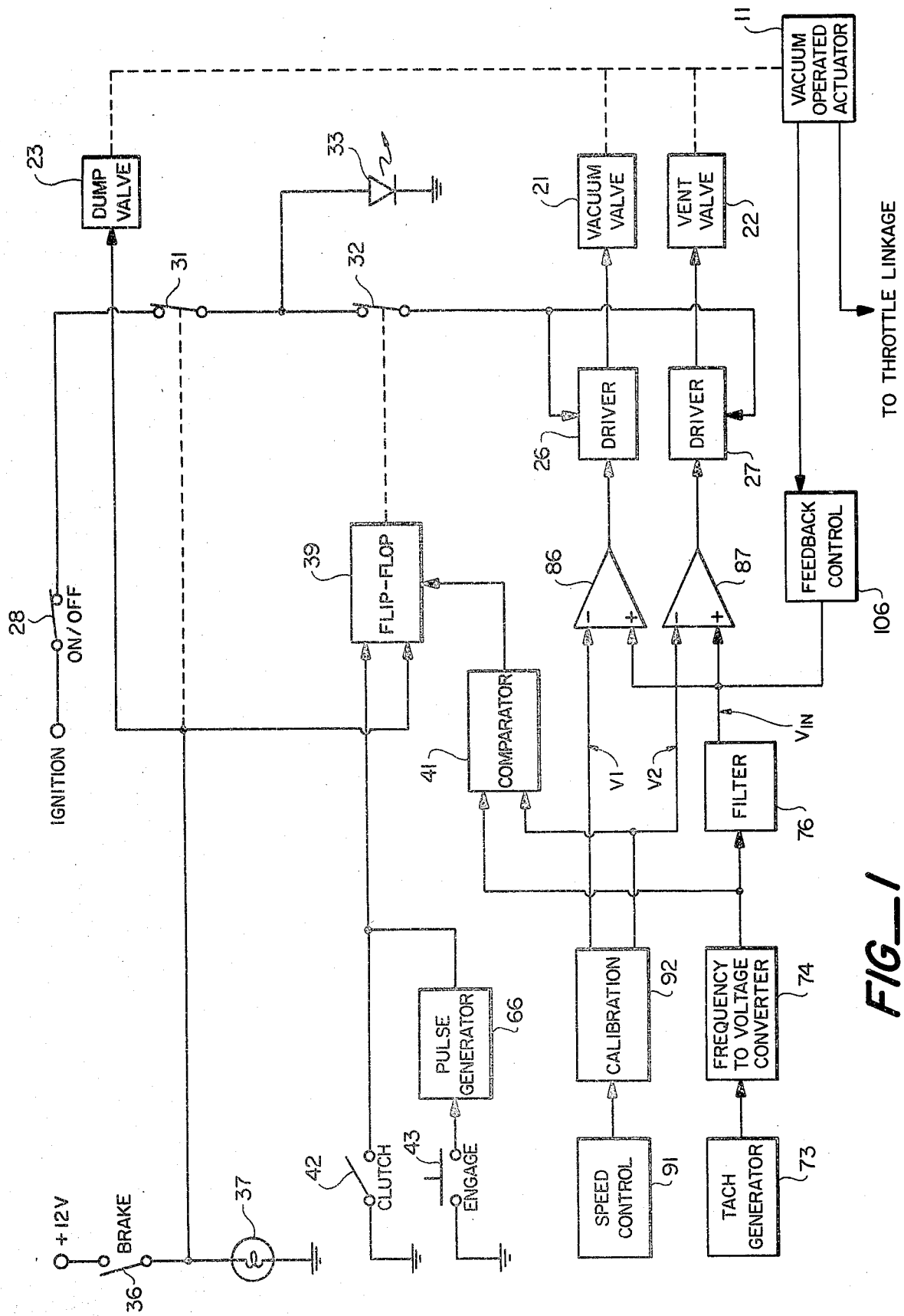

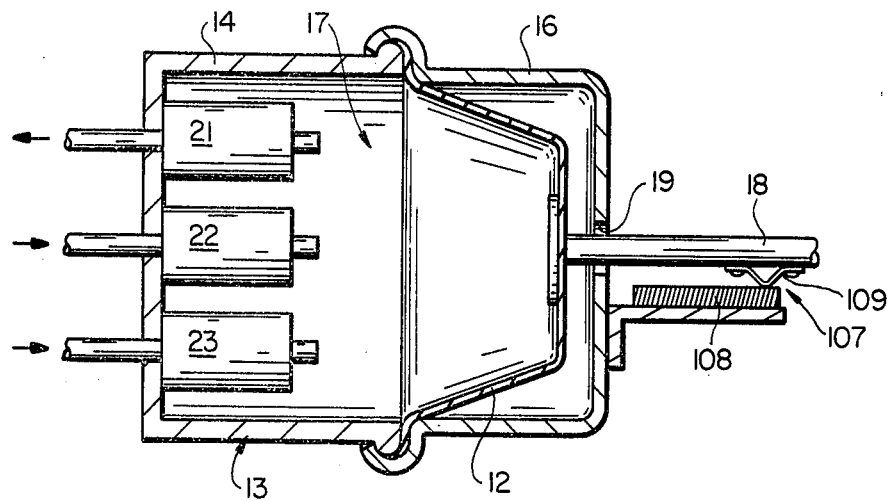
FIG_2
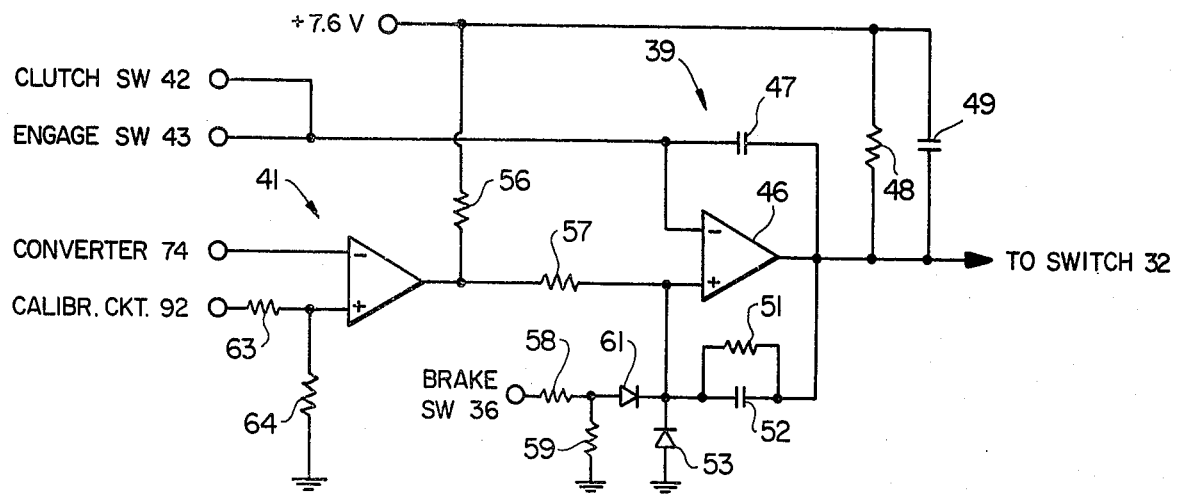
FIG_3
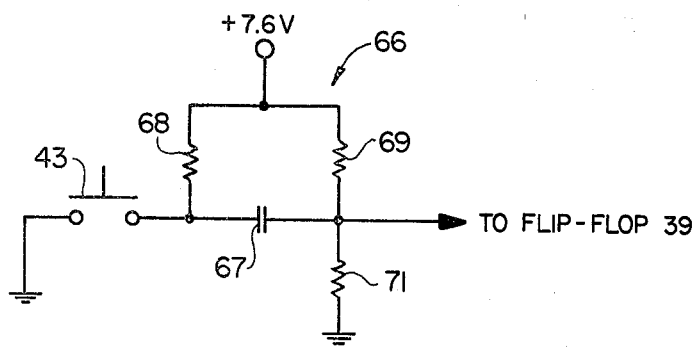
FIG_4

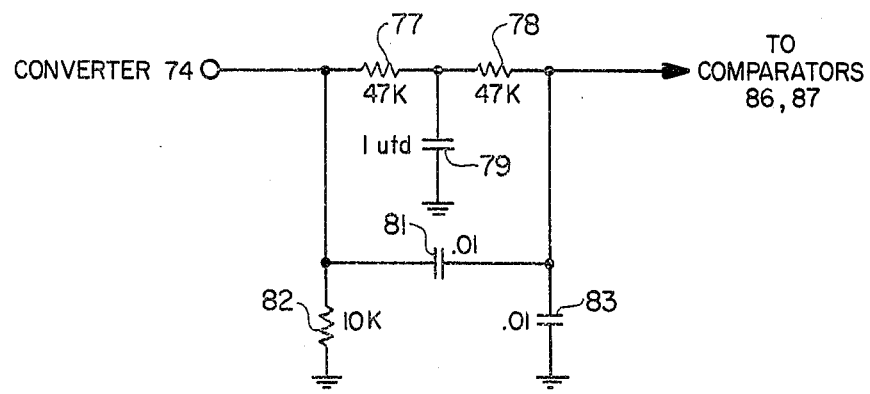
FIG_5
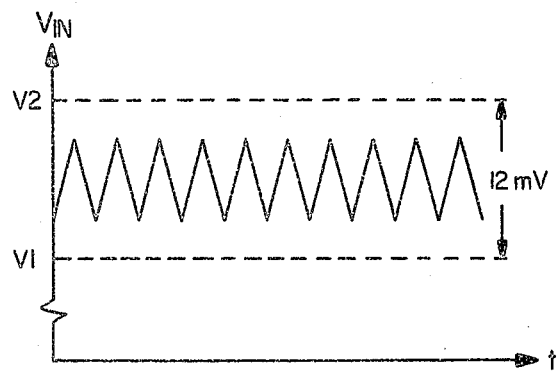
FIG_6
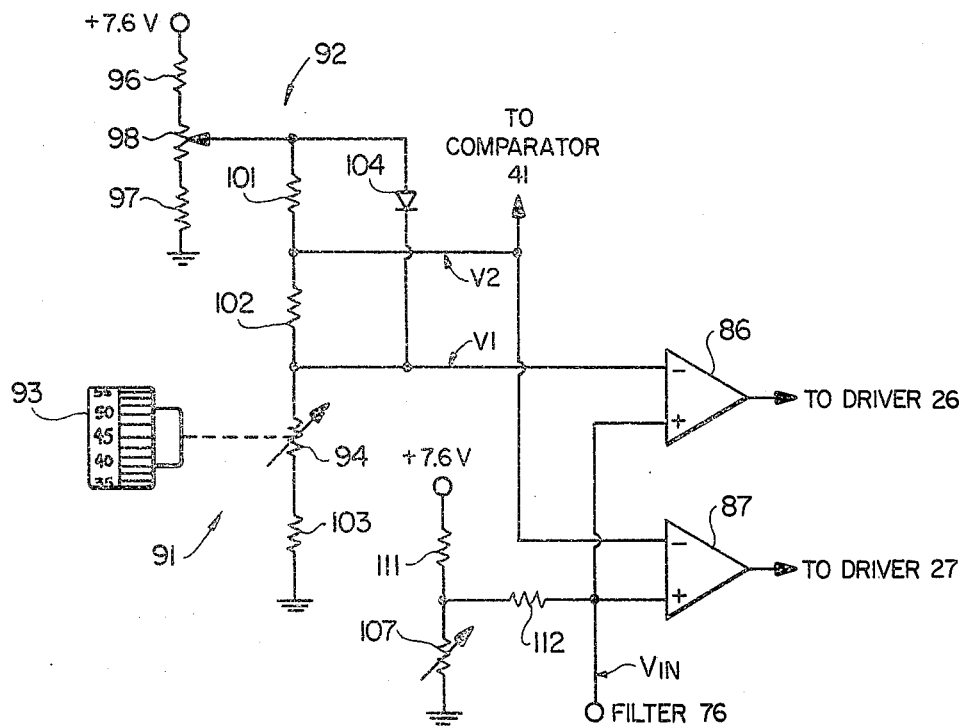
FIG_7

VEHICLE SPEED CONTROL SYSTEM

This invention pertains generally to control systems and more particularly to a system for controlling the speed of a vehicle such as an automobile.

Automotive speed controls, or cruise controls, heretofore provided have had certain limitations and disadvantages. In one of the more commonly used systems, for example, the operator of the vehicle must manually bring the vehicle up to the speed to be maintained, then engage the control, following which the control will simply maintain the vehicle at the speed it had when the control was engaged. The operator cannot set the speed in advance and have the control bring the vehicle to the desired speed. Once engaged, the prior systems are typically disengaged by applying the brakes and/or operating a separate switch provided for the purpose. In addition, the prior systems are generally not accurate enough to be calibrated in units of speed, and they are generally not interchangeable between vehicles having different gearing and other drive train components.

It is in general an object of the invention to provide a new and improved system for controlling the speed of a vehicle.

Another object of the invention is to provide a system of the above character in which the operator can select the speed to be maintained in advance of the vehicle actually reaching that speed.

Another object of the invention is to provide a system of the above character which can be engaged and disengaged by a single switch controlled by the operator of the vehicle.

Another object of the invention is to provide a system of the above character having redundant means for disengaging the system to return control of the vehicle to the operator.

Another object of the invention is to provide a system of the above character in which the amount of correction is reduced as the vehicle approaches the desired speed to provide a smooth and positive transition to the desired speed.

Another object of the invention is to provide a system of the above character which can be calibrated for use with any vehicle regardless of gear ratios and other drive train components.

These and other objects are achieved in accordance with the invention by providing a control system having means for providing an input signal corresponding to the speed of the vehicle, manually operable means including a dial calibrated in units of speed for providing a reference signal corresponding to the desired speed of travel, whereby the operator of the vehicle can select the desired speed independently of the speed of the vehicle at the time the selection is made, means for adjusting the reference signal to calibrate the dial for the vehicle, and means responsive to the input and reference signals for adjusting the speed of the vehicle to the desired speed. The system cannot be engaged until the vehicle has reached a predetermined fraction of the desired speed, and once engaged, the system can be disengaged by application of the brakes, disengagement of the clutch, or operation of a manual switch. Application of the brakes initiates two separate modes of disengagement to make certain that control of the vehicle is returned to the operator immediately. As the desired speed is approached, the amount of correction is reduced to assure a smooth but positive transition to the desired speed.

FIG. 1 is a block diagram of one embodiment of a speed control system according to the invention.

FIG. 2 is a centerline sectional view, somewhat schematic, of a valve and actuator assembly for use in the system of FIG. 1.

FIG. 3 is a circuit diagram of the comparator and flip-flop stages in the control section of the system of FIG. 1.

FIG. 4 is a circuit diagram of the pulse generator of the system of FIG. 1.

FIG. 5 is a circuit diagram of the filter for the input signal in the system of FIG. 1.

FIG. 6 is a graphical representation showing the relationship between the input signal and the threshold levels of the comparators in the system of FIG. 1.

FIG. 7 is a circuit diagram of the speed control, calibration, feedback control and comparator stages of the system of FIG. 1.

The system includes a vacuum-operated actuator 11 which is mounted on the engine of the vehicle and connected to the carburetor throttle linkage in a conventional manner. The actuator includes a flexible diaphragm 12 mounted in a housing 13 having a base 14 and a cover 16. The peripheral margin of the diaphragm is clamped between the cover and base to form a closed chamber 17 between the diaphragm and base. An output shaft 18 is connected to the diaphragm and extends through an opening 19 in the housing cover for connection to the throttle linkage.

Electrically energized solenoid valves 21-23 control the application of vacuum to chamber 17 and, thus, the position of diaphragm 12 and output shaft 18. These valves are mounted on the base of the actuator housing in direct communication with the chamber. Valve 21 is normally closed and is connected to a suitable vacuum source such as the intake manifold of the engine. Valve 22 is normally open and is vented to the atmosphere, and valve 23 is normally closed and is vented to the atmosphere.

The operation of valves 21,22 is controlled by drivers 26,27 which receive operating power from the ignition switch of the vehicle through an ON/OFF switch 28 in series with switches 31,32. Switch 28 is a manually operated switch, and switches 31,32 are electronic switches of suitable known design. In order for drivers 26,27 to receive operating power, switches 28,31 and 32 must all be in their closed or ON states. A light-emitting diode (LED) 33 is connected between the supply side of switch 32 and ground and, as discussed more fully hereinafter, serves as both a pilot light and a test light for the system.

Switch 31 is normally closed and is controlled by the brake light switch 36 of the vehicle. Switch 36 is connected in series with the brake lights 37 of the vehicle, and closure of switch 36 causes switch 31 to open, interrupting the delivery of operating power to the drivers for valves 21,22.

Switch 32 is controlled by a flip-flop 39 which receives an enabling input signal from a comparator 41 and control inputs from brake light switch 36, a clutch switch 42, and an ENGAGE switch 43. As illustrated in FIG. 3, flip-flop 39 utilizes a comparator 46 wired in a bistable configuration with a capacitor 47 connected between the output and the (−) input of the comparator. A resistor 48 and a capacitor 49 are connected between the output of the comparator and a positive voltage source, e.g., 7.6 V. A resistor 51 and a capacitor 52 are connected between the output and the (+) inut of the comparator, and a diode 53 is connected between the (+) input and ground. The output of comparator 41 is connected to the positive voltage source by a resistor 56 and to the (+) input of comparator 46 by a resistor 57. The brake light switch is connected to the (+) input of comparator 46 through a voltage divider comprising resistors 58,59 and a diode 61. The signals from clutch switch 42 and ENGAGE switch 43 are applied to the (−) input of comparator 46. As discussed more fully hereinafter, a signal corresponding to the speed of the vehicle is applied to the (−) input of comparator 41, and a reference signal corresponding to a fraction of the desired speed of the vehicle is applied to the (+) input terminal through a voltage divider comprising resistors 63,64.

Clutch switch 42 is utilized only for vehicles having a manual transmission. It is connected to the clutch pedal or linkage in such manner that the switch is closed, grounding the input of the flip-flop, when the clutch is disengaged.

ENGAGE switch 43 is a normally open pushbutton switch which is utilized for both engaging and disengaging the system. This switch is connected to a pulse generator 66 which delivers a negative pulse upon closure of the switch. One terminal of the switch is connected to ground, and as illustrated in FIG. 4, the other terminal is connected to one side of a capacitor 67 in the pulse generator. Resistors 68,69 are connected between the two sides of the capacitor and the positive voltage source, and a resistor 71 is connected between the output side of the capacitor and ground. When switch 43 is open, the output side of the capacitor is charged negatively with respect to the switch side, and upon grounding of the switch side, a negative pulse is applied to the flip-flop.

At this point, it can be noted that the system can be engaged by depressing switch 43 once the vehicle has reached the threshold speed set by the reference signal applied to comparator 41. Thereafter, the system can be disengaged in one of three ways: (1) depressing switch 43 a second time, (2) applying the brakes, or (3) disengaging the clutch. Any one of these three actions will change the state of flip-flop 39, opening switch 32 and interrupting the delivery of power to the drivers for valves 21,22. The system can also be disengaged by means of the ignition switch or ON/OFF switch 28.

The operation of valve 23 is controlled directly by brake light switch 36. This valve is connected electrically in parallel with the brake lights of the vehicle and is energized, whenever the brakes are applied. When energized, valve 23 overrides the action of valves 21,22 and dumps the vacuum from actuator 11 to the atmosphere regardless of the state of the other valves. This redundancy provides a measure of safety which assures that full control of the vehicle will be returned to the operator whenever the brakes are applied.

Means is included for providing an input signal corrresponding to the speed of the vehicle. This means includes a tach generator 73 comprising a pair of magnets (not shown) mounted on the drive shaft of the vehicle and a pick-up coil (not shown) in proximity to the magnets. Two pulses are generated in the coil for each revolution of the drive shaft, and this pulsating signal is applied to the input of a frequency-to-voltage converter 74. In the preferred embodiment, a National Semiconductor model LM 2917N-B converter is utilized. This converter delivers a DC output voltage having a level corresponding to the frequency of the input pulses, with a small ripple at twice the frequency of the input pulses. As discussed more fully hereinafter, this ripple is utilized to vary the duty cycle at which valves 21,22 are operated to provide a gradual transition to the desired speed.

The output of converter 74 is connected to the (−) input of comparator 41 and to the input of a filter 76. As illustrated in FIG. 5, this filter comprises resistors 77, 78 connected in series between the input and output terminals, with a capacitor 79 connected between the junction of the resistors and ground. A capacitor 81 is connected between the input and output terminals in parallel with resistors 77,78. A resistor 82 is connected between the input terminal and ground, and a capacitor 83 is connected between the output terminal and ground. Capacitor 79 serves to remove some of the high-frequency ripple of the input signal, while capacitor 81 passes a portion of the higher frequencies. The signal at the output of the filter has a DC level corresponding to the speed of the vehicle with a ripple of generally triangular waveform having an amplitude on the order of 3–8 millivolts. This waveform, designated $V_{IN}$, is illustrated in FIG. 6.

The output of filter 76 is connected to the (+) inputs of comparators 86,87, and the outputs of these comparators are connected to the inputs of drivers 26,27 to control the operation of valves 21,22.

The system also includes a speed control 91 and a calibration circuit 92 which supply reference signals to comparators 86,87 to determine the speed at which the vehicle will travel under the control of the system. The speed control permits the operator of the vehicle to select the speed, and the calibration circuit permits the system to be calibrated for use with a wide variety of vehicles.

As illustrated in FIG. 7, the speed control includes a manually operable dial or knob 93 which is calibrated in units of speed, e.g., miles per hour, and connected to a variable resistor or potentiometer 94. Both the speed control and ENGAGE switch 43 are mounted in a location convenient to the operator of the vehicle, and in the preferred embodiment they are mounted on an arm on the steering column of the vehicle. If desired, the control arm can be combined with the turn signal indicator switch lever found in most vehicles. Potentiometer 94 has a detent mechanism which tends to stop the control shaft in a predetermined position, and in the preferred embodiment, this position corresponds to a speed of 55 mph.

Calibration circuit 92 includes a voltage divider comprising fixed resistors 96,97 and potentiometer 98 connected in series between a positive voltage source and ground. The source voltage is preferably regulated, for example, by a Zener diode circuit operating on current obtained from the output of switch 31. The output or wiper of calibration potentiometer 98 is connected to a second voltage divider comprising resistors 101, 102, speed control resistor 94 and an additional resistor 93 connected in series between the output of the potentiometer and ground, with a diode 104 connected across resistors 101 and 102. Resistor 103 sets the minimum speed which the system will maintain, and diode 104 provides a constant forward voltage drop of 0.6 V regardless of the setting of potentiometer 98 and resistor 94. The action of diode 104 also produces a constant voltage drop across resistor 102, and in the preferred embodiment, the values of resistors 101,102 are such that the voltage V1 at the lower end of resistor 102 is on the order of 12 millivolts lower than the voltage V2 at the junction of resistors 101,102. Voltages V1,V2 are applied to the (−) inputs of comparators 86,87 and serve as the reference voltages for the comparators. Voltage V2 is also applied to comparator 41 as a reference signal through the voltage divider consisting of resistors 63,64. In the preferred embodiment, the values of these resistors are such that this reference signal corresponds to approximately one-half of the speed for which the speed contol is set.

A feedback control 106 is connected to comparators 86,87 for regulating the sensitivity or amount of correction provided by the system. This control includes a potentiometer or variable resistor 107 operably connected to the output shaft 18 of the actuator. As illustrated in FIG. 2, the resistor includes a resistive element 108 mounted in a stationary position on housing cover 16 and a wiper 109 mounted on the output shaft in position to engage the resistive element. Resistor 107 is connected in series with a fixed resistor 111 between the positive voltage source and ground to form a voltage divider, and the junction of these resistors is connected to the (+) inputs of comparators 86,87. Thus, the feedback signal is combined with or superimposed on the input signal $V_{IN}$ from filter 76 and serves to counteract changes in the input signal. In the preferred embodiment, the values of resistors 107 and 111 are such that the feedback control becomes effective when the vehicle speed is within about 10 mph of the desired speed.

Operation and use of the control system is as follows. It is assumed that the system is installed in an automobile having a manually shifted transmission and that calibration potentiometer 98 has been adjusted to calibrate the system for the gear ratio of the vehicle so that the speed to be maintained will correspond closely to the speed indicated by dial 93. In the preferred embodiment, the calibration adjustment is made at a speed of 55 mph with speed control potentiometer 94 in its detent position. It is further assumed that ON/OFF switch 28 has been closed but that the system has not as yet been engaged, i.e., switch 32 is open. With switch 32 open, drivers 26,27 are deenergized, and valve 21 is closed, blocking the application of vacuum to actuator 11. Valve 22 is open, venting the actuator chamber to the atmosphere and permitting the diaphragm and output shaft to move freely with the throttle linkage. As long as the vehicle is moving at a speed less than about one-half the speed for which dial 93 is set, the system cannot be engaged because flip-flop 39 is held in its low output state by comparator 41.

Once the speed of the vehicle is at least one-half of the speed set by dial 93, the system can be engaged by depressing ENGAGE switch 43. The closing of this switch triggers pulse generator 66 which delivers a negative going pulse to the (−) input of flip-flop 39, causing the flip-flop to switch to its high output state. This closes switch 32, delivering operating power to drivers 26,27. Assuming that the system is engaged while the vehicle is traveling at a speed substantially less than the desired speed, input signal $V_{IN}$ will be below the threshold voltages V1,V2 of comparators 86,87 and valves 21,22 will both be energized continuously. Thus, normally closed valve 21 will be open to apply vacuum to the actuator, and normally open vent valve 22 will be closed. The diaphragm and output shaft of the actuator will be drawn inwardly, opening the throttle to increase the speed of the vehicle. When the vehicle speed approaches within about 10 mph of the desired speed, feedback control 106 reduces the amount of correction provided by the system by providing a decreasing voltage to the (+) inputs of comparators 86,87. When the vehicle speed approaches within about 3 mph of the speed for which the system is set, the ripple of input voltage $V_{IN}$ begins to swing above threshold voltage V1 of comparator 86. Valve 21 then begins to open intermittently, with a duty cycle which decreases as the level of the input signal continues to increase. When the input signal increases to the point where it remains above threshold level V1 throughout its swing, valve 21 remains closed. As long as the input signal remains between threshold voltages V1 and V2, as illustrated in FIG. 6, valves 21 and 22 both remain closed, and the actuator shaft remains in a fixed position, with the vehicle traveling at the desired speed.

Thereafter, if the vehicle should start to drift below the desired speed, input signal $V_{IN}$ will begin to swing below threshold level V1, and valve 21 will again operate to supply vacuum to the actuator to return the vehicle to the desired speed. If the vehicle speed should drift above the desired speed, the input signal will begin to swing above threshold level V2, and this will cause valve 22 to open and vent some of the vacuum to reduce the speed of the vehicle. As long as the vehicle is moving at the desired speed, the input waveform will remain between the threshold levels, and valves 21,22 will remain closed.

Once engaged, the system will remain engaged until the vehicle operator either applies the brakes, disengages the clutch or depresses ENGAGE switch 43 again. Any one of these actions will cause flip-flop 39 to switch to its low output state, opening switch 32 to interrupt the delivery of power to the valve. When this happens, valve 21 returns to its normally closed state, and valve 22 return to its normally open state, venting the actuator to the atmosphere and releasing the throttle linkage from the control of the system.

Application of the brakes also causes switch 31 to open, interrupting the flow of current to switch 32. Thus, the system will be disengaged upon application of the brakes even though switch 32 might fail to open for some reason.

Application of the brakes also causes normally closed valve 23 to open, dumping the vacuum from the actuator to the atmosphere. Thus, the system is disengaged, and control of the vehicle is returned to the operator regardless of the state of valves 21,22 at the time.

The system can also be disengaged by opening ON/OFF switch 28 or by overriding the engine with the brakes until the speed of the vehicle drops below the threshold level set by comparator 41. The latter technique can be employed as an emergency measure in the unlikely event of a failure which would prevent all of the other methods of disengaging the system from functioning.

As mentioned above, LED 33 serves both as a pilot light and as a test light for the system. The LED is energized upon closure of the ON/OFF switch, and it remains energized as long as this switch and switch 31 remain closed. When the brakes are applied and switch 31 opens, the light goes out. By observing the LED and applying the brakes, the operator can check the operation of the system. If the light is on prior to application of the brakes, the operator knows that the system is getting power through switch 31. If the light goes out when the brakes are applied, the operator knows that brake light switch 36 and switch 31 are both operating properly. If the light fails to go out, the operator knows that either switch 36 or switch 31 is not operating properly and that the system should not be engaged until the malfunction is corrected.

The system has a number of important features and advantages. The operator can select the speed he wants in advance, and the system will adjust the vehicle to that speed. The system can be calibrated for the gear ratio of any vehicle, and it can be installed in existing vehicles as well as new vehicles. The system is inherently safe because of the numerous ways it can be disengaged and the redundancy which is provided in the case of braking. Moreover, the system is not likely to be engaged accidentally since it cannot be engaged until the speed of the vehicle is at least one-half of the desired speed. The reduction of the duty cycle and the amount of correction provided as the vehicle approaches the desired speed assure a smooth but positive transition to the desired speed.

It is apparent from the foregoing that a new and improved vehicle speed control system has been provided. While only one presently preferred embodiment has been described in detail, as will be apparent to those familiar with the art, certain changes and modifications can be made without departing from the scope of the invention as defined by the following claims.

What is claimed is:

1. In a system for controlling the speed of a vehicle having throttle and brake controls: means for providing an input signal which varies cyclically in amplitude about a DC level which corresponds to the speed of the vehicle, said signal lying in a predetermined range between first and second reference levels when the vehicle is moving at a desired speed and extending outside said range when the vehicle speed differs from the desired speed, said range being wider than the amplitude variations of the input signal, and the portion of an input signal cycle during which the input signal is outside the predetermined range varying in accordance with the speed of the vehicle and increasing as the DC level approaches one of the reference levels, means for sensing when the input signal is outside the predetermined range, and means connected to the throttle control for adjusting the vehicle speed toward the desired speed when the input signal is outside the predetermined range, the amount of adjustment increasing as the vehicle speed moves farther from the desired speed and decreasing as the vehicle speed approaches the desired speed.

2. The system of claim 1 further including manually operable means including a dial calibrated in units of speed for providing a reference signal corresponding to the desired speed and defining the predetermined range, whereby the operator of the vehicle can select the desired speed independently of the speed of the vehicle at the time the selection is made, and means for adjusting one of the signals to calibrate the dial for the vehicle.

3. The system of claim 2 further including means for providing a control signal corresponding to the amount of speed adjustment provided by the system, and means for combining the control signal with one of the other signals to reduce the amount of speed adjustment as the vehicle approaches the desired speed.

4. The system of claim 2 wherein the manually operable means includes detent means for holding the same in a position corresponding to a predetermined speed.

5. The system of claim 1 including means for inhibiting operation of the means for adjusting the speed of the vehicle until the vehicle has reached a predetermined speed relative to the desired speed.

6. The system of claim 5 further including means operated by the vehicle operator for selectively engaging the system to control the speed of the vehicle when the vehicle has reached a predetermined fraction of the predetermined speed.

7. The system of claim 1 wherein the means for adjusting the speed of the vehicle includes a vacuum-operated actuator, valve means for controlling the application of vacuum to the actuator, and means for operating the valve means in accordance with the input signal.

8. The system of claim 7 wherein the valve means includes a first valve for applying vacuum to the actuator to move the throttle in one direction, a second valve for venting vacuum from the actuator to move the throttle in the opposite direction, and a third valve responsive to the brake control for releasing the vacuum from the actuator to release the vehicle from the control of the system upon braking of the vehicle.

9. The system of claim 1 wherein the means for adjusting the speed of the vehicle includes a vacuum-operated actuator, electrically operated valve means for controlling the application of vacuum to the actuator, means including a bistable circuit having first and second output states for controlling the application of operating power to the valve means, said valve means receiving power only when the bistable circuit is in its second output state, a manually operable pushbutton switch connected to the bistable circuit for switching said circuit from the first state to the second state and from the second state to the first state upon successive depressions of said switch, and means responsive to the brake control for switching the bistable circuit from the second state to the first state upon braking of the vehicle.

10. The system of claim 9 including means for inhibiting switching of the bistable circuit from the first state to the second state until the vehicle is traveling at a predetermined speed.

11. The system of claim 9 wherein the vehicle has a clutch and the system includes means for switching the bistable circuit from the second state to the first state upon operation of the clutch.

12. The system of claim 9 further including an additional valve connected to the actuator, and means responsive to the brake control for opening the additional valve to release the vacuum from the actuator and thereby release the throttle from control of the system upon braking of the vehicle.

13. In a system for controlling the speed of a vehicle: means for providing an input signal having a generally triangular waveform of predetermined amplitude and a DC level corresponding to the speed of the vehicle, a vacuum-operated actuator for connection to the throttle control of the vehicle, a normally closed electrically operated valve for controlling the application of vacuum to the actuator, a normally open electrically operated valve for venting the vacuum from the actuator, means including a first comparator responsive to the input signal for opening the normally closed valve when the input signal is below a first reference level, and means including a second comparator responsive to the input signal for closing the normally open valve when the input signal is above a second reference level, said second reference level being higher than the first reference level by an amount greater than the amplitude of the input signal, the waveform of the input signal falling entirely between the first and second reference levels when the vehicle is moving at a desired speed so that neither of the valves is actuated, said waveform crossing one of the reference levels when the vehicle speed differs from the desired speed to actuate the corresponding valve with a duty cycle which decreases as the vehicle speed approaches the desired speed.

14. The system of claim 13, further including means including a manually operable dial calibrated in units of speed for supplying reference signals of the first and second levels to the comparators whereby the operator of the vehicle can select the desired speed independently of the speed of the vehicle when the selection is made.

15. The system of claim 14 including means for adjusting the levels of the reference signals to calibrate the system for the vehicle so that the speed indicated by the dial will correspond to the speed at which the vehicle is traveling when the input signal is between the reference levels.

16. The system of claim 13 further including means responsive to the position of the actuator for providing a control signal which is combined with the input signal to decrease the amount of actuator movement as the vehicle speed approaches the desired speed.

17. In a system for controlling the speed of a vehicle: means for providing an input signal having a predetermined amplitude and a DC level corresponding to the speed of the vehicle, manually operable means including a dial calibrated in units of speed for providing a reference signal corresponding to the desired speed of travel, whereby the operator of the vehicle can select the desired speed independently of the speed of the vehicle at the time the selection is made, means for adjusting one of the signals to calibrate the dial for the vehicle, a vacuum-operated actuator adapted for connection to the throttle system of the vehicle, valve means for controlling the application of vacuum to the actuator, and comparator means for operating the valve means in accordance with the reference and input signals to adjust the speed of the vehicle to the desired speed, said comparator means comprising first and second comparators having thresholds which differ by more than the amplitude of the input signal waveform, said waveform being entirely within the range between the thresholds with the actuator at rest when the vehicle is travelling at the desired speed and crossing one of the thresholds to operate the actuator intermittently when the vehicle speed differs from the desired speed, the duty cycle of the actuator decreasing as the vehicle approaches the desired speed.

* * * * *